United States Patent
Bohling et al.

(10) Patent No.: US 10,280,301 B2
(45) Date of Patent: May 7, 2019

(54) PHOSPHOROUS-ACID MONOMER CONTAINING EMULSION POLYMER MODIFIED UREA-FORMALDEHYDE RESIN COMPOSITIONS FOR MAKING FIBERGLASS PRODUCTS

(71) Applicant: Rohm and Haas Company, Philadelphia, PA (US)

(72) Inventors: James C. Bohling, Lansdale, PA (US); Arnold S. Brownell, Lansdale, PA (US); Michael D. Kelly, North Wales, PA (US)

(73) Assignee: Rohm and Haas Company, Collegeville, PA (US)

( * ) Notice: Subject to any disclaimer, the term of this patent is extended or adjusted under 35 U.S.C. 154(b) by 331 days.

(21) Appl. No.: 15/320,519

(22) PCT Filed: Jun. 10, 2015

(86) PCT No.: PCT/US2015/035034
§ 371 (c)(1),
(2) Date: Dec. 20, 2016

(87) PCT Pub. No.: WO2015/199985
PCT Pub. Date: Dec. 30, 2015

(65) Prior Publication Data
US 2017/0152379 A1    Jun. 1, 2017

Related U.S. Application Data

(60) Provisional application No. 62/018,107, filed on Jun. 27, 2014.

(51) Int. Cl.
| | |
|---|---|
| C08F 2/00 | (2006.01) |
| C08F 2/24 | (2006.01) |
| C08F 2/26 | (2006.01) |
| D04H 1/64 | (2012.01) |
| C08F 30/02 | (2006.01) |
| C08F 36/20 | (2006.01) |
| C08L 43/02 | (2006.01) |
| C08L 61/06 | (2006.01) |
| C08L 61/24 | (2006.01) |
| D04H 1/587 | (2012.01) |
| C08F 212/08 | (2006.01) |
| C08F 212/14 | (2006.01) |
| C08F 220/06 | (2006.01) |
| C08F 220/18 | (2006.01) |
| C08F 230/08 | (2006.01) |
| C08F 290/00 | (2006.01) |
| C09J 161/24 | (2006.01) |
| D04H 1/4218 | (2012.01) |
| D06M 15/432 | (2006.01) |

(52) U.S. Cl.
CPC ............. *C08L 61/24* (2013.01); *C08F 2/001* (2013.01); *C08F 2/24* (2013.01); *C08F 2/26* (2013.01); *C08F 30/02* (2013.01); *C08F 36/20* (2013.01); *C08F 220/18* (2013.01); *C08F 290/00* (2013.01); *C08L 43/02* (2013.01); *C08L 61/06* (2013.01); *C09J 161/24* (2013.01); *D04H 1/4218* (2013.01); *D04H 1/587* (2013.01); *D04H 1/64* (2013.01); *D06M 15/432* (2013.01); *C08F 212/08* (2013.01); *C08F 212/14* (2013.01); *C08F 220/06* (2013.01); *C08F 2220/1825* (2013.01); *C08F 2230/085* (2013.01); *C08L 2201/52* (2013.01); *C08L 2201/54* (2013.01); *D10B 2101/06* (2013.01)

(58) Field of Classification Search
CPC ........ C08F 2/001; C08F 290/00; C08F 30/02; C08F 36/20; C08F 2/24; C08F 2/26; C08F 220/18; C08F 212/08; C08F 220/06; C08F 212/04; C08F 2230/085; C08F 2220/1825; D04H 1/587; D04H 1/64; D04H 1/4218; C09J 161/24; C08L 43/02; C08L 61/24; C08L 61/06; C08L 2201/54; C08L 2201/52; D06M 15/432; D10B 2101/06
USPC .......................................................... 524/460
See application file for complete search history.

(56) References Cited

U.S. PATENT DOCUMENTS

| | | | |
|---|---|---|---|
| 4,859,508 | A | 8/1989 | Pangrazi et al. |
| 5,804,254 | A | 9/1998 | Nedwick et al. |
| 6,642,299 | B2 | 11/2003 | Wertz et al. |
| 6,770,169 | B1 | 8/2004 | Wallace |
| 7,179,531 | B2 | 2/2007 | Brown et al. |

(Continued)

FOREIGN PATENT DOCUMENTS

| | | |
|---|---|---|
| JP | 198889253 A | 10/1989 |
| WO | 2013116318 A1 | 8/2013 |
| WO | 2014088873 A1 | 6/2014 |

*Primary Examiner* — Angela C Scott

(57) ABSTRACT

The present invention provides polymer modified aqueous urea formaldehyde resin (UF resin) binder compositions useful in making a treated glass mat, e.g., for roofing shingles, wherein the polymer modifier is an multistage aqueous emulsion acorn copolymer comprising one protuberant polymer stage containing phosphorous acid groups and one or more other polymer stage comprising an addition copolymer incompatible with the protuberant polymer stage, wherein the multistage aqueous emulsion copolymer has a measured Tg of from −60 to 25° C., or, preferably from −30 to 12° C. and, further wherein the weight ratio of the total of monomers used to make the one or more other polymer stage to the total amount of monomers used to make the protuberant polymer stage ranges from 3:1 to 50:1, or, preferably, from 3:1 to 30:1 or, more preferably, from 3:1 to 20:1, or, even more preferably, from 8:1 to 12:1.

10 Claims, No Drawings

(56) References Cited

U.S. PATENT DOCUMENTS

2007/0192966 A1    8/2007   Cottrell et al.
2009/0124151 A1    5/2009   Shoemake
2012/0058277 A1    3/2012   Bohling et al.

ness. The binder compositions impart mat strength to the
PHOSPHOROUS-ACID MONOMER CONTAINING EMULSION POLYMER MODIFIED UREA-FORMALDEHYDE RESIN COMPOSITIONS FOR MAKING FIBERGLASS PRODUCTS The present invention relates to aqueous urea formaldehyde (UF) resin binder compositions comprising at least one multistage emulsion copolymer as a polymer modifier wherein one polymer stage of the multistage emulsion copolymer comprises at least one phosphorous acid group containing polymer and sticks out or protuberates from the other polymer stage or stages of the multistage emulsion copolymer, to the methods for using the aqueous urea formaldehyde resin binder compositions to make fiberglass mat products, and to the products made by the methods of the present invention.

Glass fiber mats, and fiber mats made from synthetic fibers and fiber blends find wide application in the building materials industry, for example, as insulation, as a substrate for making composite flooring, or as a substrate for making roofing shingles. Fiber mats, and especially glass fiber mats, are commonly made commercially by a wet-laid process which is carried out on what can be viewed as modified paper-making equipment. In this process, a fiber slurry is deposited on the moving screen or cylinder is processed into a sheet-like fiber mat by the removal of water, usually by suction and/or vacuum devices. This is followed by the application of a resinous or polymeric binder to the mat to hold the glass fiber mat together. After applying the binder, the mat is set or cured with heating to provide the desired mat integrity.

A widely used binder formulation for making fiber mats, especially glass fiber mats, comprises a thermosetting urea-formaldehyde (UF) resin, which can be fortified with an emulsion polymer or solution polymer. UF resins have commonly been employed because they are relatively inexpensive. The binder compositions impart mat strength to the ultimately cured mat, and function to improve the strength of the uncured, wet-laid mat as it is transported from its initial formation into and through the curing oven. Because glass fiber mats made with a binder consisting essentially of a UF resin often are brittle, the addition of emulsion polymers has proven effective at increasing the flexibility of the mat resulting in improved mechanical properties such as tensile strength and tear resistance.

U.S. Pat. No. 6,770,169, to Wallace, discloses a binder composition for glass fiber mats comprising a urea-formaldehyde resin fortified with an emulsion polymer containing the polymerized residue of an anionic phosphate group-containing monomer. However, no details are provided for the method of preparation of the polymer, and it is well known to those skilled in the art that the method of preparing an emulsion polymer comprising a phosphorous containing monomer is critical in determining its performance in a binder.

The present inventors have endeavored to solve the problem of providing aqueous urea formaldehyde (UF) resin binder compositions providing improved tensile strength and tear resistance when applied and cured on fiberglass substrates, as compared to known aqueous emulsion polymer modified UF resin binders.

1. In accordance with the present invention, aqueous urea formaldehyde resin (UF resin) binder compositions comprise UF resin and from 2 to 10 wt. %, preferably, from 3 to 9 wt. %, or, more preferably, from 4 to 8 wt. %, based on the total solids of the binder composition, of at least one polymer modifier which is a multistage aqueous emulsion copolymer having two or more polymer stages and having one protuberant polymer stage which is a phosphorous acid group containing polymer that sticks out or protuberates from the one or more other polymer stages of the multistage emulsion copolymer, the protuberant polymer stage copolymer comprising, as copolymerized units, a) from 0.5 to 10 wt. %, or, preferably, from 2 to 7 wt. % of one or more phosphorus acid monomers or salts thereof; b) from 0.2 to 20 wt. %, or, preferably, from 0.5 to 5 wt. %, of one or more carboxylic acid monomers, sulfur acid monomers, salts thereof or combinations thereof; c) from 0.1 to 30 wt. %, preferably, from 0.2 to 10 wt. % of one or more multiethylenically unsaturated monomers; and d) as the remainder of monomers at least one second monoethylenically unsaturated monomer, all monomer proportions based on the total weight of monomers used to make the emulsion copolymer, and the overall multistage aqueous emulsion copolymer comprising a copolymer having a measured glass transition temperature of from −60 to 25° C., or, preferably, from −30 to 12° C.

2. Preferably, the aqueous urea formaldehyde resin binder composition of 1, above, comprises 5 wt. % or less, or, preferably, 0.5 wt. % or less, or, more preferably, 0.1 wt. % or less of a phenolic resin, based on total solids in the binder composition.

3. In accordance with the compositions of present invention in 1 or 2, above, the weight ratio of the one or more other polymer stage of the multistage emulsion copolymer to the protuberant polymer stage ranges from 3:1 to 50:1, or, preferably, from 3:1 to 30:1 or, more preferably, from 3:1 to 20:1, or, even more preferably, from 8:1 to 12:1, based on the total weight of monomers used to make the respective stages of the emulsion copolymer.

4. In accordance with the compositions of present invention in 1, 2, or 3, above, the protuberant polymer stage of the multistage aqueous emulsion copolymer comprises a pre-form or seed polymer.

5. In accordance with the compositions of present invention in any of 1, 2, 3 or 4, above, the one or more other polymer stages of the multistage aqueous emulsion copolymer is the copolymerization product of less than 2 wt. % of any one or more phosphorous acid monomer, based on the total weight of monomers used to make the one or more other polymer stages or, preferably, is substantially free of phosphorous acid groups.

6. In accordance with the compositions of present invention in any of 1, 2, 3, 4 or 5, above, the multistage aqueous emulsion copolymer further comprises as copolymerized units one or more silicon containing monomer, such as a silane containing monomer.

7. In accordance with the compositions of present invention in any of 1, 2, 3, 4, 5, or 6, above, the multistage aqueous emulsion copolymer comprises styrene or alkyl-substituted styrene as copolymerized units of a second monoethylenically unsaturated monomer.

In yet another aspect, the present invention provides methods of using the aqueous urea formaldehyde resin binder compositions of any of items 1 to 6, above, to make fiberglass mat products, the methods comprising applying the aqueous urea formaldehyde resin binder composition to or treating with the aqueous urea formaldehyde resin composition a wet laid continuous glass fiber mat and heating to cure the aqueous urea formaldehyde resin composition to form a treated glass mat.

In yet still another aspect of the present invention, the present invention comprises the treated glass mat made from the aqueous urea formaldehyde resin binder compositions of any of items 1 to 6, above, by applying the composition to a wet laid continuous glass fiber mat or treating a wet laid continuous glass fiber mat with the aqueous urea formaldehyde resin binder composition and heating to cure the aqueous urea formaldehyde resin composition to form a treated glass mat, such as, for use in making asphalt coated roofing shingles.

In yet even still another aspect of the present invention, methods of making the aqueous urea formaldehyde resin binder compositions of the present invention of any of items 1 to 6 above, comprising emulsion copolymerizing a first monomer mixture of a) one or more phosphorous acid monomers, b) one or more carboxylic acid monomers, sulfur acid monomers or salts thereof, c) one or more multiethylenically unsaturated monomer and d) one or more second monoethylenically unsaturated monomer to form a pre-form or seed polymer, followed by copolymerizing in the presence of the pre-form or seed polymer, a second monomer mixture of one or more second monoethylenically unsaturated monomer and one or more multiethylenically unsaturated monomer to form the one or more other polymer stage, preferably, by gradual addition polymerization, wherein the weight ratio of the second monomer mixture to the first monomer mixture is from 3:1 to 50:1, or, preferably, from 3:1 to 20:1, or, more preferably, from 8:1 to 12:1.

Unless otherwise indicated, all temperature and pressure units are room temperature and standard pressure.

The singular forms "a," "an," and "the" include plural referents unless the context clearly dictates otherwise.

Unless defined otherwise, technical and scientific terms used herein have the same meaning as is commonly understood by one skilled in the art.

All ranges are inclusive and are combinable. Thus, for example, the disclosure of a composition which comprises from 0.01 to 5 wt. %, from 5 wt. % or less, or, preferably, 0.5 wt. % or less, or, more preferably, 0.1 wt. % or less of a phenolic resin will be read as including ranges of from 0.01 to 0.1 wt. %, from 0.01 to 5 wt. %, from 0.1 to 0.5 wt. %, from 0.1 to 5 wt. % and from 0.5 to 5 wt. %.

All phrases comprising parentheses denote either or both of the included parenthetical matter and its absence. For example, the phrase "(meth)acrylate" includes, in the alternative, acrylate and methacrylate.

As used herein, the term "aqueous" or "aqueous solvent" includes water and mixtures composed substantially of water and water-miscible solvents.

As used herein, unless otherwise indicated, the term "viscosity" refers to viscosity of a composition having the indicated solids and materials as measured on a DV-III Ultra LV Brookfield viscometer (Brookfield Engineering Laboratories, Middleboro, Mass.) at 30 rpm using spindle #31 with sample temperature maintained at a constant 25° C.

As used herein, the phrase "based on the total binder solids" or "based on total solids in the binder compositions" refers to weight amounts of any given ingredient in comparison to the total weight amount of all of the non-volatile ingredients in the binder. Volatile ingredients include both water and ammonia as well as volatile solvents that volatilize under use conditions like lower alkanols.

As used herein, the phrase "based on the total weight of monomers used to make the emulsion copolymer," refers to all addition monomers used to make the multistage aqueous emulsion copolymer of the present invention, such as, for example, all second monoethylenically unsaturated monomers, phosphorus acid monomers, multiethylenically unsaturated monomers and carboxylic acid functional vinyl or unsaturated monomers, as well as any chain transfer agents which leave a residue in the polymer, such as phosphorous or sulfur containing compounds or their salts.

As used herein, the phrase "binder application conditions" means conditions at ambient, or room temperature (typically 21-23° C.), and standard pressure.

As used herein, the phrase "measured glass transition temperature" or "measured Tg" means that amount determined from a given copolymer by conventional differential scanning calorimetry (DSC), as described, e.g., in ASTM 3418/82 (ASTM International, West Conshohocken, Pa. 1982). To measure Tg by this method, the copolymer samples were dried, preheated to 150° C., rapidly cooled to −90° C., and then heated to 150° C. at a rate of 20° C./minute. The Tg was measured at the midpoint in the heat flow versus temperature transition as the Tg value using the half-height method (Thermal Analysis Q 1000 using RCS cooling, Advantage for Q Series software, version 2.5.0.256, TA Instruments, New Castle, Del.).

Unless otherwise indicated, as used herein, the term "molecular weight" or "Mw" refers to a weight average molecular weight as determined by aqueous gel permeation chromatography (GPC) using an Agilent 1100 HPLC system (Agilent Technologies, Santa Clara, Calif.) equipped with an isocratic pump, vacuum degasser, variable injection size auto-sampler, and column heater. The detector was a Refractive Index Agilent 1100 HPLC G1362A. The software used to chart weight average molecular weight was an Agilent ChemStation, version B.04.02 with Agilent GPC-add on version B.01.01. The column set was TOSOH Bioscience TSKgel G2500PWxl 7.8 mm ID×30 cm, 7 μm column (P/N 08020) (TOSOH Bioscience USA South San Francisco, Calif.) and a TOSOH Bioscience TSKgel GMPWxl 7.8 mm ID×30 cm, 13 μm (P/N 08025) column. A 20 mM Phosphate buffer in MilliQ™ HPLC Water, pH ~7.0 was used as the mobile phase. The flow rate was 1.0 ml/minute. A typical injection volume was 20 μL. The system was calibrated using poly(acrylic acid), Na salts Mp 216 to Mp 1,100,000, with Mp 900 to Mp 1,100,000 standards from American Polymer Standards (Mentor, Ohio). As used herein, the units of Mw are grams/mole (g/mole).

As used herein, the phrase "copolymerized unit" means the addition copolymerization product of an addition polymerizable monomer, including acrylic or vinyl monomers.

As used herein, the phrase "substantially free of phosphorous acid groups" means that a polymer stage of the multistage aqueous emulsion copolymer of the present invention is the copolymerization product of less than 1000 ppm of phosphorous acid monomers, or, preferably, less than 500 ppm, based on the total weight of monomers used to make the emulsion copolymer.

As used herein, the term "use conditions" means standard pressure and temperatures ranging from the ambient temperature to the upper end of the disclosed binder cure temperature.

As used herein, the term "wt. %" stands for weight percent.

In accordance with the present invention, the phosphorous acid monomer containing multistage aqueous emulsion copolymers of the present invention provide improved polymer modified aqueous UF resin compositions. The polymer modifiers of the present invention provide improved tensile strength and tear resistance when applied and cured on fiberglass substrates, as compared to known aqueous emulsion polymer modified UF resin binders. The polymer modifiers are substantially free of formaldehyde. The phosphorous acid group containing polymer modifiers according to the present invention have particular utility as glass mat binders for asphalt coated roofing shingles.

The multistage aqueous emulsion copolymers of the present invention have a protuberant polymer stage comprising phosphorous acid groups. Such protuberant polymer stage containing multistage polymers are otherwise known as acorn polymers. These polymers result from the incompatibility between the protuberant polymer stage and the one or more other polymer stages of the polymers, which is presumably, in part, a result of the relative mismatch of charge—the protuberant polymer stage or pre-form polymer is more highly charged than the one or more other polymer stages and therefore more hydrophilic and, in part, a result of having the protuberant polymer stage or pre-form polymer be crosslinked and the one or more other stages be relatively free of crosslinking.

To make the multistage aqueous emulsion copolymer of the present invention, an aqueous dispersion of pre-form polymer particles or the protuberant polymer stage from a first monomer mixture is contacted with a second monomer mixture under emulsion polymerization conditions to form a stable aqueous dispersion of a polymer stage or pre-form or seed particles protuberating from the thus formed multistage copolymer particles.

It is critical that the protuberant polymer stage or pre-form polymer particles solids content range from 30 wt. % or more, or, preferably, from 40 to 50 wt. %, or, more preferably 45 to 50 wt. %, based on the weight of the stable aqueous dispersion of the preformed polymer particles. The relatively high solids content increases the likelihood of incorporating phosphorus acid monomer onto the surface of the pre-form polymer particles or the protuberant polymer stage; consequently, the presence of the phosphorus acid monomer in the aqueous phase in the one or more other polymer stages is significantly diminished, leading to the desired imbalance of adsorbing phosphorus acid groups in favor of the core of the acorn particle.

The relatively high solids content of the pre-formed polymer dispersion has the added benefit of facilitating the second stage polymerization reaction by enabling less volume of water in the reactor, thereby promoting process flexibility and, ultimately, higher solids in the final product.

The multistage aqueous emulsion copolymers of the present invention are formed by conventional aqueous emulsion copolymerization in two or more stages in the presence of initiators, such as thermal, e.g., peracid or peroxide, initiators or redox, e.g., a combination or peroxide and bisulfite, initiators. Methods for making polymers containing a protuberant polymer stage are known and disclosed, for example, in U.S. Pat. No. 7,179,53162 to Brown et al. and in WIPO Publication WO 2013/116318A1 to Bohling et al.

The initial or protuberant polymer stage may be formed by bulk, shot or gradual addition polymerization and is, preferably, formed as a pre-form or seed polymer and can be formed in situ in the same reaction vessel in which the one or more other polymer stages is then formed. The protuberant polymer stage comprises a much more hydrophilic polymer than the one or more other polymer stages of the multistage aqueous emulsion copolymer of the present invention. All of or at least 80 wt. %, or at least 90 wt. % the phosphorous acid monomer used to make the multistage aqueous emulsion copolymer of the present invention is used in making the protuberant polymer stage or pre-form polymer.

The other one or more stages of the multistage aqueous emulsion copolymer of the present invention are formed by polymerization of a second monomer emulsion in the presence of the protuberant polymer stage or in the presence of an in situ seed protuberant polymer stage formed from copolymerization of a first monomer mixture.

The weight ratio of the monomers in the second monomer mixture to the weight of the monomers in the first monomer mixture (used to form the protuberant polymer stage or pre-form polymer particles) ranges of from 3:1 to 50:1, or, preferably, from 3:1 to 30:1 or, more preferably, from 3:1 to 20:1, or, even more preferably, from 8:1 to 12:1.

Thus, to form the protuberant polymer stage or pre-form or seed polymer of the present invention, a first monomer mixture is charged or fed to a reaction vessel to form an aqueous copolymerization mixture which is polymerized to form the protuberant polymer stage or the pre-form or seed polymer particles thereof, followed by polymerizing a second monomer mixture in the presence of the protuberant polymer stage, pre-form polymer or seed to form the other polymer stage.

The first monomer mixture comprises from a) 0.5 to 10 wt. % of a phosphorus acid monomer or a salt thereof; b) from 0.2 to 20 wt. %s of a carboxylic acid monomer or a sulfur acid monomer or a salt thereof or a combination thereof; c) from 0.1 to 30 wt. % of a multiethylenically unsaturated monomer; and d) one or more second monomers which are re polymerizable ethylenically unsaturated monomers. The first monomer mixture gives a seed polymer or polymer stage having a measured Tg of from −60 to 35° C.

The multistage aqueous emulsion copolymer of the present invention comprises as copolymerized units from 0.5 to 10 wt. %, or, preferably, from 2 to 7 wt. % of one or more phosphorus acid monomers or salts thereof. Thus, the first monomer mixture and the second monomer mixture comprise, together, from 0.5 to 10 wt. %, or, preferably, from 2 to 7 wt. % of one or more phosphorus acid monomers or salts thereof, based on the total weight of monomers used to make the multistage emulsion copolymer.

The second monomer mixture comprises as copolymerized units a) less than 20 wt. %, or, preferably, less than 10 wt. % of the total phosphorus acid monomer and salts thereof used to make the multistage aqueous emulsion copolymer of the present invention; b) from 0.1 to 4 wt. % of a carboxylic acid monomer or sulfur acid monomer or a salt thereof or combination thereof, based on the total weight of monomers used to make the emulsion copolymer; c) less than 0.5 wt. % of a multiethylenically unsaturated monomer based on the total weight of monomers used to make the emulsion copolymer; and d) a sufficient proportion of one or more second monoethylenically unsaturated monomers so that the polymer particles arising from the polymerization of the second monomer mixture has a measured Tg in the range of from −60 to 25° C., or, preferably, from −30 to 12° C.

Preferably, the first monomer mixture of the present invention is chosen to provide a concentration of copolymerized units of d) second monoethylenically unsaturated monomers in the protuberant polymer stage or the pre-form or seed polymer particles of the present invention of 50 wt. % or more or, more preferably, from 70 to 97 wt. %, based on the weight of the monomers used to form the protuberant polymer stage, pre-form or seed polymer particles.

Preferably, all of the a) phosphorous acid monomer in the multistage aqueous emulsion copolymer of the present invention is contained as a copolymerized unit in the protuberant polymer stage, seed or pre-form particle. That is, preferably, all of the a) phosphorous acid monomer is contained in the first monomer emulsion of the present invention.

Assuming that the weight to weight ratio of monomers in the second monomer mixture to the first monomer mixture (or the pre-formed polymer) is 10:1, the monomers in the second monomer mixture could contain less than 10 wt. % of the phosphorus acid monomer in the pre-formed polymer, which corresponds approximately to less than 1 wt. % of the phosphorus acid monomer, based on the total weight of monomers used to make the emulsion copolymer.

The phosphorous acid monomers a) of the present invention may be used in their acid form or as a salt of the phosphorus acid groups. Examples of suitable monoethylenically unsaturated phosphorus acid monomers include any of the following formulae:

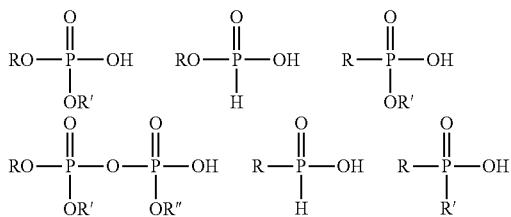

wherein R is an organic group containing an acryloxy, methacryloxy, or a vinyl group; and R' and R" are independently selected from H and a second organic group. The second organic group may be saturated or unsaturated.

Examples of suitable phosphorus acid monomers include phosphonates and dihydrogen phosphate esters of an alcohol in which the alcohol contains or is substituted with a polymerizable vinyl or olefinic group.

Suitable phosphorus acid monomers may include dihydrogen phosphate-functional monomers such as dihydrogen phosphate esters of an alcohol in which the alcohol also contains a polymerizable vinyl or olefinic group, such as allyl phosphate, mono- or diphosphate of bis(hydroxymethyl) fumarate or itaconate, derivatives of (meth)acrylic acid esters, such as, for example, phosphates of hydroxyalkyl(meth)acrylates including 2-hydroxyethyl (meth)acrylate, 3-hydroxypropyl (meth)acrylates, and the like. Other suitable monoethylenically unsaturated phosphorus acid monomers include phosphonate-functional monomers, such as vinyl phosphonic acid, allyl phosphonic acid, 2-acrylamido-2-methylpropanephosphonic acid, -phosphonostyrene, 2-methylacrylamido-2-methylpropanephosphonic acid. Further suitable monoethylenically unsaturated phosphorus functional monomers include 1,2-ethylenically unsaturated (hydroxy)phosphinylalkyl (meth)acrylate monomers, such as (hydroxy)phosphinylmethyl methacrylate.

Preferably, the monoethylenically unsaturated phosphorus acid monomers are dihydrogen phosphate monomers, which include 2-phosphoethyl (meth)acrylate (PEM), 2-phosphopropyl (meth)acrylate, 3-phosphopropyl (meth)acrylate, and 3-phospho-2-hydroxypropyl (meth)acrylate.

Most preferably, the monoethylenically unsaturated phosphorus acid monomer is the mono- or diphosphate of 2-hydroxyethyl (meth)acrylate. Suitable as carboxylic acid or sulfur acid monomers b) of the present invention may include acrylic acid, methacrylic acid, itaconic acid, and salts thereof; sulfur acids, including sulfoethyl methacrylate, sulfopropyl methacrylate, styrene sulfonic acid, vinyl sulfonic acid, and 2-(meth)acrylamido-2-methyl propanesulfonic acid, and salts thereof. Preferably, a carboxylic acid monomer is used to prepare the preformed polymer, more preferably acrylic acid or methacrylic acid.

Suitable as examples of the one or more multiethylenically unsaturated monomers c) for making the multistage aqueous emulsion copolymer of the present invention are any having two or more ethylenically unsaturated bonds, such as, phosphorous containing multiethylenically unsaturated PEM diesters (phosphodiesters), allyl (meth)acrylate, diallyl phthalate, glycol di(meth)acrylates, such as, for example, 1,2-ethyleneglycol di(meth)acrylate, 1,4-butylene glycol di(meth)acrylate, 1,6-hexanediol di(meth)acrylate; and divinyl benzene. Preferably, the multiethylenically unsaturated monomer is allyl (meth)acrylate.

The multiethylenically unsaturated monomer c) preferably contains two ethylenically unsaturated groups.

To the extent the multiethylenically unsaturated monomer comprises a phosphorus acid monomer, such a monomer proportion should fall within the proportions of phosphorus acid monomer for the overall multistage aqueous emulsion copolymer of the present invention. Thus, the multistage aqueous emulsion copolymer of the present invention comprises as copolymerized units, from 0.5 to 10 wt. %, or, preferably, from 2 to 7 wt. % of one or more phosphorus acid monomers or salts thereof, based on the total weight of monomers used to make the multistage emulsion copolymer.

Preferably, the protuberant polymer stage or pre-form polymer comprises from 0.2 to 10 wt. % of multiethylenically unsaturated monomers, based on the total weight of monomers used to make the protuberant polymer stage or pre-form polymer.

Suitable second monoethylenically unsaturated monomers d) of the present invention include any nonionic acrylic or vinyl monomers (i.e. those which do not bear a charge in water at a pH of 1 to 14), such as $C_1$ to $C_{30}$(cyclo)alkyl (meth)acrylates, like methyl (meth)acrylate, ethyl methacrylate, butyl (meth)acrylate, 2-ethylhexyl (meth)acrylate, decyl acrylate, lauryl (meth)acrylate, and isodecyl (meth)acrylate; (meth)acrylamides, alkyl substituted (meth)acrylamides, such as N-alkyl (meth)acrylamides and N,N-dialkyl (meth)acrylamides; ethylene; propylene; styrene and alkyl substituted styrenes, such as alpha methyl styrene; butadiene; vinyl esters, such as vinyl acetate and vinyl butyrate; vinyl chloride, vinyl toluene and vinyl benzophenone; (meth)acrylonitrile; and vinylidene halides, such as, vinylidene chloride. Preferably, the second monoethylenically unsaturated monomers are chosen from butyl acrylate, ethyl acrylate, methyl methacrylate, ethyl methacrylate, ethylhexyl (meth)acrylate, styrene, mixtures thereof and mixtures of styrene with an alkyl (meth)acrylate.

Examples of silicon containing monomers include polymerizable silane-group containing monomers, such as vinyl trialkoxysilane, e.g., vinyl trimethoxysilane or vinyl triethoxysilane, alkylvinyl dialkoxysilanes, (meth)acryloxyalkyl trialkoxysilanes, e.g., (meth)acryloxypropyl trimethoxysilane, vinyl trichlorosilane, (meth)acryloxyethyl methyldialkoxysilanes, (meth)acryloxypropyl methyldialkoxysilanes and vinyl tris(beta-methoxyethoxy) silane.

The second monomer mixture preferably comprises methyl methacrylate or styrene or a combination thereof; ethyl acrylate, butyl acrylate, or ethylhexyl acrylate, or a combination thereof; and (meth)acrylic acid or sodium styrene sulfonate or salts thereof or a combination thereof.

The concentration of the second monoethylenically unsaturated monomer in the second monomer mixture is preferably from 80 to 99 wt. %, based on the weight of the monomers in the second monomer mixture.

Preferably, the second monomer mixture comprises butyl acrylate in the amount of 40 to 70 wt. %, or, more preferably 45 to 65 wt. %, based on the weight of monomers in the second monomer mixture.

Preferably, the second monomer mixture comprises ethylhexyl acrylate in amounts ranging from 30 to 65 wt. %, or, more preferably, 35 to 60 wt. %, based on the total weight of monomers in the second monomer mixture.

Preferably, the second monomer mixture comprises acrylic acid or methacrylic acid or sodium styrene sulfonate or a combination thereof in a total amount ranging from of 1 to 4 wt. %, all based on the weight of monomers in the second monomer mixture.

The preferred weight ratio of monomers in the second monomer mixture to the first monomer mixture is less than 20:1, or, for example, from 8:1 to 12:1.

The emulsion polymerization reactions used to form all stages of the multistage aqueous emulsion copolymer of the present invention advantageously include suitable surfactants, preferably one or more anionic surfactants such as alkali metal alkyl ether sulfates or benzene sulfonates; examples of such surfactants include sodium laureth-4-sulfate (commercially available as Disponil™ FES 32 surfactant, Cognis Corp, Cincinnati, Ohio), sodium laureth-12-sulfate (commercially available as Disponil™ FES 993 surfactant) or sodium dodecylbenzene sulfonate.

To formulate the aqueous urea formaldehyde resin binder compositions of the present invention, the multistage aqueous emulsion copolymer can be added individually to the UF resin, or the multistage aqueous emulsion copolymer and any additives may be supplied in the form of an additive blend. The formulation may be prepared using conventional mixing or stirring techniques to provide a homogeneous solution.

Additives useful in the aqueous binder compositions may include conventional adjuvants such as, for example, pigments, fillers, such as clays, anti-migration aids, curing agents, neutralizers, coalescents, wetting agents, biocides, plasticizers, organosilanes, anti-foaming agents, colorants, waxes, anti-oxidants, surfactants, and dispersants, such as polyacrylic acid salts.

The binder compositions of the present invention should have a viscosity of from 5 to 60 centipoises (cPs) at 25° C. at 8.0% solids, and 30 rpm of shear as measured on a DV-III Ultra LV Brookfield viscometer, or, preferably, 40 cPs or less, or, more preferably, 30 cPs or less.

The methods of using the aqueous urea formaldehyde resin compositions of the present invention comprise treating a wet laid fibrous glass mat with the binder composition by soaking the mat in an excess of binder solution, or by coating or impregnating binder directly into the fibrous mat, e.g., with a falling film curtain coater and then curing the binder. Following application of the binder, the fibrous glass mat is de-watered under vacuum to remove excess binder solution. The mat is then dried and the binder composition is cured in an oven at elevated temperatures. Curing comprises heat treating the binder treated mat at from 100 to 400° C., or, preferably, from 180 to 260° C., for a time sufficient to cure the resin. The product of the treating methods is referred to as a "treated glass mat".

Preferably, the treating in the method of using the aqueous urea formaldehyde resin compositions of the present invention comprises soaking the fibrous glass mat in an excess of a binder composition, or coating or impregnating binder directly into the fibrous mat, e.g., with a falling film curtain coater.

Aside from making roofing shingles, the treated glass mats of the present invention may be used as a substrate for making composite flooring, as a substrate for making siding (replacing similar sheets traditionally made using wood, cellulose or asbestos fibers), as a substrate for printed circuit boards or battery separators, as filter stock, as tape stock, as reinforcement scrim in cementitious and non-cementitious coatings for masonry, and as facing material for laminated articles such as foam composites and gypsum boards.

EXAMPLES

The following examples illustrate the present invention. Unless otherwise indicated, all parts and percentages are by weight and all temperatures are in ° C., all pressures are standard pressure, and all temperatures are room temperature.

Synthesis Example 1

A) Pre-Form Synthesis

A monomer emulsion was prepared by mixing 200 g of deionized water, 64 g (30% active) anionic surfactant sodium laureth-12-sulfate, 371.2 g butyl acrylate (BA), 195.2 g methyl methacrylate (MMA), 9.6 g allyl methacrylate, 51.2 g (50% active) phosphoethyl methacrylate, and 12.8 g methacrylic acid.

The reactor used was a 5-liter, four necked round bottom flask equipped with a paddle stirrer, a thermometer, nitrogen inlet, and a reflux condenser. To the flask was added 600 g of deionized water and 21.3 g (30% active) anionic surfactant sodium laureth-4-sulfate. The contents of the flask were heated to 85° C. under a nitrogen atmosphere and stirring initiated. A portion of the first monomer emulsion (70 g) was then added, quickly followed by a solution of 2.56 g sodium persulfate dissolved in 30 g deionized water and a rinse of 5 g of deionized water. After stirring for 10 minutes, the remainder of the first monomer emulsion, followed by a 25 g water rinse, and an initiator solution of 0.64 g sodium persulfate dissolved in 50 g of deionized water were added linearly and separately over 40 minutes. After the monomer emulsion feed was finished, the contents of the flask were held at 85° C. for 10 minutes. After 10 minutes the cofeed finished, and the contents of the flask were held at 85° C. for an additional 10 minutes.

The contents of the flask were cooled to room temperature and neutralized to pH 3 with a dilute solution of ammonium hydroxide. The measured particle size was 60-75 nm and the solids were 40-41%.

B) Preform Process Copolymerization

The reactor was a 5-liter, four necked round bottom flask equipped with a paddle stirrer, a thermometer, nitrogen inlet, and a reflux condenser. To the flask was added 950 g of deionized water. The contents of the flask were heated to 85° C. under a nitrogen atmosphere and stirring initiated. A solution of 4.8 g sodium persulfate dissolved in 20 g deionized water, and a rinse of 5 g of deionized water was added to the flask. An amount of the pre-form equal to 10 wt. % of the total final polymer (~400 g) was added to the flask. Once the flask temperature had returned to >80° C., a monomer emulsion feed of a second monomer emulsion was started.

A second monomer emulsion was prepared by mixing 340 g of deionized water, 66 g (23% active) anionic surfactant C, 856.8 g butyl acrylate, 545.8 g styrene, 28.8 g acrylic acid, 4.8 g (90% active) sodium 4-vinylbenzenesulfonate, and 4.3 g vinyltrimethoxysilane.

The monomer emulsion and an oxidant solution containing 2.4 g sodium persulfate and 2 g (50% active) sodium hydroxide dissolved in 57 g water were added linearly and separately to the flask over a period of 120 minutes. The contents of the flask were maintained at a temperature of 85° C. during the addition of the monomer emulsion. When all additions were complete, the container containing the monomer emulsion was rinsed with 25 g deionized water, which was then added to the flask.

The contents of the flask were cooled to 65° C. and a catalyst/activator pair were added to the flask to reduce residual monomer. 10.7 g (70% solids) of nonionic surfactant was added. The polymer was then neutralized to pH 8.5 with a dilute ammonium hydroxide/sodium hydroxide solution. The measured particle size was 130-150 nm and the solids were 45-46%.

Synthesis Example 2

The synthesis for Example 2 was carried out substantially as shown in Example 1, except that the 4.3 g vinyltrimethoxysilane in the second monomer emulsion was replaced with an equal weight of styrene, bringing the total styrene content to 550.1 g.

Synthesis Example 3

The synthesis for Comparative Example 1 was carried out substantially as shown in Example 1, except that 720 g of butyl acrylate and 682.6 g of styrene was used in the second monomer emulsion.

Comparative Example 1

The polymer used in this Example was a single stage emulsion copolymer comprising as a monomer mixture, by weight, 55BA/42MMA/3 phosphoethyl methacrylate (65% active) prepared under standard gradual addition emulsion polymerization, including 1% sodium lauryl ether sulfate and 1% n-dodecyl mercaptan, based on total polymer solids. The polymerization was initiated thermally with ammonium persulfate.

Comparative Example 2

A Rhoplex™ GL-618 acrylic emulsion polymer (The Dow Chemical Co., Midland, Mich.) was used as the polymer modifier.

Comparative Example 3

No polymer modifier was used.

TABLE A

Emulsion Copolymer Compositions

| Polymer Example | Polymer Composition | $T_g$, ° C. | Solids, % |
|---|---|---|---|
| Ex. 1 | Sty-acrylic staged PEM, acorn morphology, silane monomer | 5 | 45.0 |
| Ex. 2 | Sty-acrylic staged PEM, acorn morphology | 5 | 45.0 |
| Ex. 3 | Sty-acrylic staged PEM w/silane monomer[2], acorn morphology | 18 | 45.0 |

TABLE A-continued

Emulsion Copolymer Compositions

| Polymer Example | Polymer Composition | $T_g$, ° C. | Solids, % |
|---|---|---|---|
| C1 | Non-staged PEM functional | 0 | 50.5 |
| C2 | MOA[1] stabilized acrylic emulsion polymer | 35 | 48.0 |
| C3 | — | — | — |

[1]MOA" = 50 wt. % methylolacrylamide:50 wt. % acrylamide;
[2]Silane monomer = vinyltrimethoxysilane Test Methods: In the examples that follow, the following test methods were used.

The glass fiber mats are prepared on an industrial scale using conventional glass fiber mat processing techniques known to person skilled in the art, or on a smaller scale using conventional handsheet casting techniques.

Glass Mat (Handsheet) Preparation Procedure and Test Procedures:

This procedure is employed to prepare the mats, or handsheets, used in the examples that follow. Glass fiber nonwoven handsheets are prepared with Owens Corning CS 9501-16W, 31.7 mm (1¼ inch) length, sized glass chop using approximately 7.3 grams of glass fiber per sheet (83 g/m²; equivalent to 1.7 pounds per 100 square feet). The glass fiber is dispersed in water using NACLEAR™ 7768 (Nalco Company, Naperville, Ill.), an anionic polyacrylamide water-in-oil emulsion, and RHODAMEEN™ VP-532 SPB (Rhodia Chemical Company, Cranbury, N.J.), an ethoxylated fatty amine cationic dispersing agent. Handsheets are formed in a Williams handsheet mold. The wet sheet is transferred to a vacuum station and de-watered. An aqueous admixture of the UF/emulsion copolymer blend of the Binder Compositions indicated in Table B, above was prepared and applied to the de-watered sheet and the excess is vacuumed off. The sheets are dried/cured in a Mathis forced air oven for 3 minutes at 200° C. The binder amount on the samples is 15% LOI (loss on ignition).

Determination of LOI (Loss On Ignition): LOI represents the percent of UF resin or modified UF resin on the glass fiber mat. In this test, a 6.4 cm by 7.6 cm (2.5 inch by 3 inch) piece of dried/cured fiberglass mat was cut. The sample was weighed and then placed in a muffle furnace at 650° C. for 2 minutes to burn off the binder. Only glass fiber remains after burning. The sample was removed and then reweighed. LOI was calculated using the equation:

% LOI=(weight before burning−weight after burning)×100/weight before burning.

A total of 3 trials were run for each Example and the reported value was the average of those trials. Target LOI was 15%.

Tensile Strength Testing: Handsheets were cut into 2.54 cm by 12.7 cm (1 inch by 5 inch) strips for tensile testing. Tensile testing was performed on seven strips from each example binder using an Instron 4201 tensile tester (manufactured by Instron, headquartered in Norwood, Mass.) equipped with a 1 kN load cell and an oven chamber encasing the jaws with a temperature range capability of −73° C. to 204° C. (−100 to 400° F.), 2.54 cm/min (1 inch/min) crosshead speed, 20% sensitivity, and a 7.6 cm (3 inch) gap. Dry tensile was performed on the prepared strips. Hot/Dry tensile testing was performed on the prepared strips after pre-heating the oven chamber to 150° C. (302° F.) prior to testing. Once pre-heated, a strip was placed in the jaws and the oven chamber was closed and equilibrated back to 150° C. (302° F.). The samples were then pulled apart at a crosshead speed of 2.54 cm/min (1 inch/min) with a 7.6 cm (3 inch) gap. All tensile values are reported in Newtons (N) the as the average of total number of trials performed for each Example.

Elmendorf Tear Strength Testing: Elmendorf tear strength was determined on cut samples of dried/cured handsheet which are 6.4 cm by 7.6 cm (2.5 inches by 3 inches). A single ply sample was placed in a Thwing-Albert Tear Tester (Thwing-Albert Instrument Company, West Berlin, N.J.) with a 1600 g tear arm. The sample was notched with a 1.9 cm (0.75 inch) cut and the arm was released. The tear strength was recorded in grams (grams force per ply). One sample was cut from each of the three handsheets made for each binder Example tested and the average of the three trials was reported.

In all the binder formulations that follow, urea formaldehyde (UF) supplied at 65.5% solids by weight was blended with the following aqueous polymer emulsions by simple mixing using a Caframo™ type RZR50 benchtop mechanical stirrer (Wiarton, Ontario, Calif.) equipped with a 2.54 cm diameter stirring blade and agitated to achieve a stable vortex for 10 minutes, at ambient temperature conditions. The binder was then diluted with water to a solids content of between 16 wt. % and 18 wt. % to achieve the target mat LOI of 15 wt. %:

TABLE B

Binder Compositions

| Binder Ex. | Polymer Ex. | % Polymer | % Binder Solids | Urea Form. Wt., gms | Polymer Wt., gms | Water Wt., gms | Total Wt., gms |
|---|---|---|---|---|---|---|---|
| Ex. 1 | Ex. 1 | 5 | 17 | 303.40 | 23.16 | 899.45 | 1226.01 |
| Ex. 2 | Ex. 1 | 10 | 17 | 291.14 | 46.91 | 903.77 | 1241.83 |
| Ex. 3 | Ex. 2 | 5 | 17 | 303.40 | 23.16 | 899.45 | 1226.01 |
| Ex. 4 | Ex. 2 | 10 | 17 | 291.14 | 46.91 | 903.77 | 1241.83 |
| Ex. 5 | Ex. 3 | 5 | 17 | 303.40 | 23.16 | 899.45 | 1226.01 |
| Ex. 6 | Ex. 3 | 10 | 17 | 291.14 | 46.91 | 903.77 | 1241.83 |
| C1 | C1 | 5 | 17 | 306.47 | 20.84 | 911.08 | 1238.39 |
| C2 | C2 | 5 | 17 | 306.47 | 21.93 | 909.99 | 1238.39 |
| C3 | C2 | 10 | 17 | 291.14 | 43.98 | 906.71 | 1241.83 |
| C4 | none | 0 | 17 | 323.32 | 0.00 | 917.85 | 1241.18 |

TABLE C

Mechanical Properties of Handsheets

| Binder Ex. | RT Tensile, N | HD Tensile, N | Tear Resistance, gms-force | LOI, wt. % |
|---|---|---|---|---|
| Ex. 1 | 147.2 | 122.8 | 410 | 14.5 |
| Ex. 2 | 137.0 | 78.7 | 482 | 21.6 |
| Ex. 3 | 100.5 | 93.0 | 375 | 14.2 |
| Ex. 4 | 127.7 | 110.8 | 429 | 15.3 |
| Ex. 5 | 115.2 | 101.0 | 419 | 16.7 |
| Ex. 6 | 100.5 | 105.0 | 405 | 14.6 |
| C1 | 111.7 | 95.2 | 406 | 18.3 |
| C2 | 97.0 | 88.1 | 356 | 16.1 |
| C3 | 128.1 | 95.2 | 349 | 21.4 |
| C4 | 108.1 | 96.1 | 282 | 20.2 |

As shown in Table C., above, each of the inventive Examples 1 to 6 gave improved RT Tensile or Tear strength when compared to UF resin treated handsheets (Example C5), known acrylic emulsion copolymer treated handsheets (Examples C3 and C4) and phosphorous acid group containing acrylic emulsion copolymer (Example C1). Examples 1 and 2 demonstrate the value of including a silane functional monomer in the compositions. The silane monomer free binder compositions performed better at higher loadings in Example 4, demonstrated a multistage aqueous emulsion copolymer of the present invention having a preferred glass transition temperature of 5° C. The Example 5 and 6 binder compositions performed well even without a silane, showing the advantage of acorn phosphorous acid group containing polymers at a glass transition temperature above the preferred range.

We claim:

1. An aqueous urea formaldehyde resin (UF resin) binder composition comprising the UF resin and from 2 to 10 wt. %, based on the total solids of the binder composition, of at least one polymer modifier which is a multistage aqueous emulsion copolymer having two or more polymer stages and having one protuberant polymer stage which is a phosphorous acid group containing polymer that sticks out or protuberates from the one or more other polymer stages of the multistage emulsion copolymer, the protuberant polymer stage copolymer comprising, as copolymerized units, a) from 0.5 to 10 wt. % of one or more phosphorus acid monomers or salts thereof; b) from 0.2 to 20 wt. %, of one or more carboxylic acid monomers, sulfur acid monomers, salts thereof or combinations thereof; c) from 0.1 to 30 wt. % of one or more multiethylenically unsaturated monomers; and d) as the remainder of monomers at least one second monoethylenically unsaturated monomer, all monomer proportions based on the total weight of monomers used to make the emulsion copolymer, and the overall multistage aqueous emulsion copolymer comprising a copolymer having a measured glass transition temperature of from −60 to 25° C.

2. The aqueous urea formaldehyde resin binder composition as claimed in claim 1, comprising from 0.1 to 5 wt. % of a phenolic resin, based on total solids in the binder composition.

3. The aqueous urea formaldehyde resin binder composition as claimed in claim 1, wherein the weight ratio of the one or more other polymer stage of the multistage emulsion copolymer to the protuberant polymer stage ranges from 3:1 to 50:1, based on the total weight of monomers used to make the respective stages of the emulsion copolymer.

4. The aqueous urea formaldehyde resin binder composition as claimed in claim 1, wherein the one protuberant polymer stage of the multistage aqueous emulsion copolymer comprises a pre-form or seed polymer.

5. The aqueous urea formaldehyde resin binder composition as claimed in claim 1, wherein the one or more other polymer stages of the multistage aqueous emulsion copolymer is the copolymerization product of less than 2 wt. % of any one or more phosphorous acid monomer, based on the total weight of monomers used to make the one or more other polymer stages.

6. The aqueous urea formaldehyde resin binder composition as claimed in claim 1, wherein the multistage aqueous emulsion copolymer further comprises as copolymerized units one or more silicon containing monomer.

7. The aqueous urea formaldehyde resin binder composition as claimed in claim 1, wherein the multistage aqueous emulsion copolymer comprises styrene or alkyl-substituted styrene as copolymerized units of a second monoethylenically unsaturated monomer.

8. The aqueous urea formaldehyde resin (UF resin) binder composition as claimed in claim 1, wherein the multistage aqueous emulsion copolymer has an overall measured Tg of from −30 to 12° C.

9. A method of using the aqueous urea formaldehyde resin (UF resin) binder composition as claimed in claim 1, comprising; applying the aqueous urea formaldehyde resin binder composition to or treating with the aqueous urea formaldehyde resin composition a wet laid continuous glass fiber mat; and, heating to cure the aqueous urea formaldehyde resin composition to form a treated glass mat.

10. A treated glass mat made by the method as claimed in claim 9.

* * * * *